T. J. & G. M. CLARK.
HAY TEDDER.
No. 100,856. Patented Mar. 15, 1870.
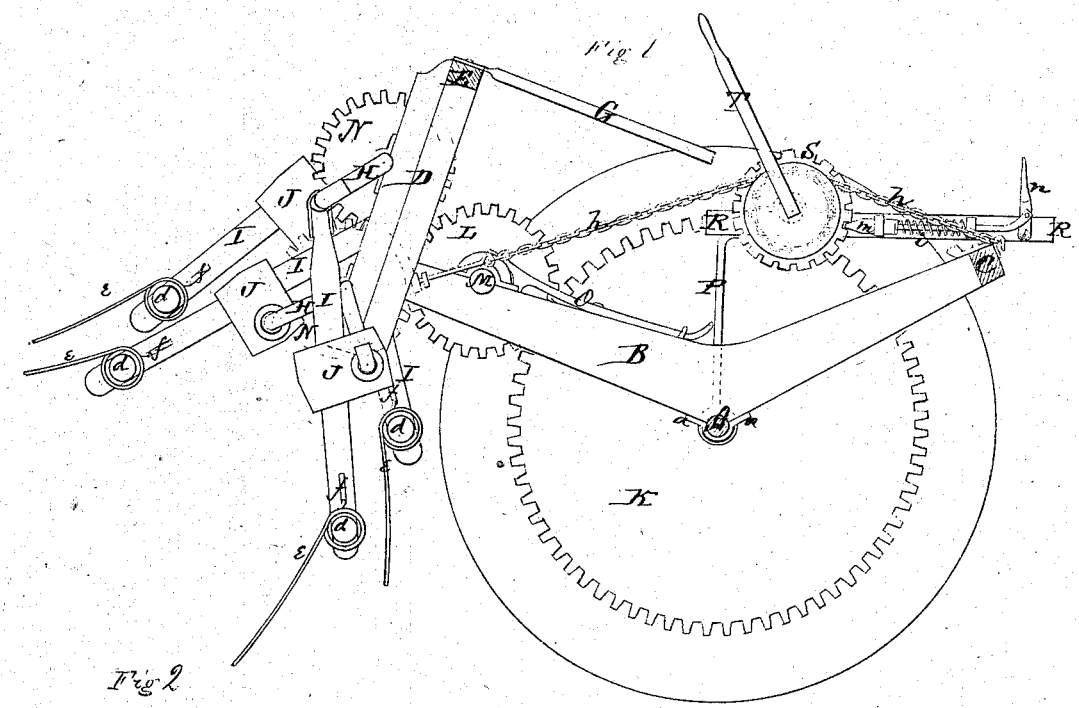
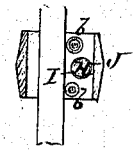
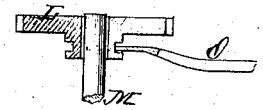
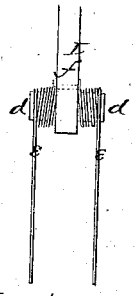
Witnesses.
Harry King
C. L. Evers
Inventor.
Thos. J. Clark
Geo. M. Clark,
per
Alexander & Mason
Attys.

United States Patent Office.

THOMAS J. CLARK AND GEORGE M. CLARK, OF HIGGANUM, CONNECTICUT.

Letters Patent No. 100,856, dated March 15, 1870.

IMPROVEMENT IN HAY-TEDDERS.

The Schedule referred to in these Letters Patent and making part of the same

To all whom it may concern:

Be it known that we, THOMAS J. CLARK and GEORGE M. CLARK, of Higganum, in the county of Middlesex, and in the State of Connecticut, have invented certain new and useful Improvements in Hay-Spreaders; and do hereby declare that the following is a full, clear, and exact description thereof, reference being had to the accompanying drawings and to the letters of reference marked thereon making a part of this specification.

The nature of my invention consists in the construction and arrangement of a device for spreading hay, as will be more fully hereinafter set forth.

In order to enable others skilled in the art to which our invention appertains to make and use the same, we will now proceed to describe its construction and operation, referring to the annexed drawings, in which—

Figure 1 is a side elevation of our machine, one wheel being removed;

Figure 2 is a longitudinal vertical section of the sleeve, with the fork-arm passing through the same;

Figure 3 is a side view of the draft-pole support;

Figure 4 is a horizontal section of the mechanism for starting and stopping the motion of the cranks, arms, and forks; and Figure 5 is a front view of one of the forks.

A represents the axle of our machine, having a series of bent or angular beams, B B, attached by means of loops or boxes $a$ $a$ secured on their under sides at the angle through which the axle passes.

The beams B B are, at their front ends, connected by a cross-bar, C, and at their rear ends are standards D D, connected by a top cross-bar E, and braced by braces G G, the whole forming a frame which oscillates or rocks upon the axle A.

Upon the rear sides of the standards D D, in suitable journal-boxes, are placed two crank-shafts H H, one above the other, having any desired number and forms of cranks, but so arranged that the corresponding cranks of each shaft do not run parallel, and no two cranks on the same shaft run in the same direction.

Upon each crank of the upper shaft is pivoted the upper end of an arm, I, which passes through a sleeve or box, J, placed on the crank of the lower shaft.

Within the sleeve or box J are two friction-rollers $b$ $b$, against which the arm I bears.

At the lower end of the arm I, on each side, is placed a pin, $d$, around which the wire tine $e$ is wrapped, the two tines forming the fork for spreading the hay.

The upper ends of the wire tines $e$ $e$ are passed through a slot in the arm I, and a key, $f$, inserted in the same slot, which firmly secures the tines.

The two cranks produce a much more rapid motion than one crank, as generally used, and this increase of speed of the forks when it acts upon the hay, making a much more effective machine.

The sleeve J can be placed on the upper shaft and the arm pivoted on the lower shaft, instead of vice versa, as above mentioned.

Motion is communicated to the crank-shafts, arms, and forks by means of a cog-wheel, K, attached to the inside of one of the wheels of the machine.

This cog-wheel gears with another cog-wheel, L, mounted loosely upon an auxiliary shaft, M, which has its bearings upon two of the beams B B.

This latter cog-wheel L gears with a cog-wheel, N, secured to one of the crank-shafts H, and this in turn with a similar cog-wheel upon the other crank-shaft. Thus the two crank-shafts are made to revolve in opposite directions.

The intermediate cog-wheel L is moved sideways away from the wheels K and N by means of a lever, O, pivoted upon one of the beams B, for the purpose of stopping the motion of the forks whenever desired, and to start them again at will.

Upon the axle A is placed a standard, P, the lower end of which is provided with a loop or eye through which the axle passes, and is secured by a key or other suitable device.

At the upper end of the standard P the draft-pole R is secured, the rear end of said draft-pole being provided with the driver's seat.

In suitable journal-boxes across the draft-pole R is a shaft, provided at one end with a cog-wheel and pulley, S, as well as a lever, T, for turning the same at will.

Around said pulley is a chain, $h$, one end of which is secured to the front cross-bar C, and the other to the rear end of one of the beams B, so that the driver can from his seat raise and lower the frame and forks at will.

On the side of the draft pole R, in suitable guides is placed a pawl or dog, $m$, which, by means of a spring, $i$, is thrown toward the rear, and engages with the cogs on the wheel and pulley S, so as to hold the same in any position that it may be placed.

The front end of the pawl $h$ is pivoted to a foot-lever, $n$, pivoted to the side of the draft-pole R, in such a position that the driver can reach it with his foot, and, by pressing on the foot-lever, withdraw the pawl from the wheel S, allowing it to be turned by the use of the lever T.

Thus, at the will of the operator, the forks may be elevated or depressed while the machine is in motion, at the same time not interfering with the action of the forks, which makes the machine very effectual on uneven ground as well as on even ground.

Having thus fully described our invention,

What we claim as new, and desire to secure by Letters Patent, is—

1. The series of arms I I, to which the forks or tedders e e are attached in the manner described, when said arms are pivoted to one of the crank-shafts H H, and pass through hollow sleeves pivoted on the other crank-shaft, and the two shafts revolving at the same time in opposite directions, substantially as and for the purposes herein set forth.

2. The oscillating or rocking frame B C D E G, constructed as described, in combination with the crank-shafts H H, gearing for revolving the same, arms I I, sleeves J J, chain h, wheel S, lever T, and pawl or dog m, all arranged and operating substantially as and for the purposes herein set forth.

In testimony that we claim the foregoing, we have hereunto set our hands this 3d day of January, 1870.

THOMAS J. CLARK.
GEORGE M. CLARK.

Witnesses:
ABRAHAM BRINARD,
GIDEON BAILEY.